United States Patent [19]

Takahashi

[11] Patent Number: 4,841,936
[45] Date of Patent: Jun. 27, 1989

[54] FUEL INJECTION CONTROL DEVICE OF AN INTERNAL COMBUSTION ENGINE

[75] Inventor: Takeshi Takahashi, Mishima, Japan

[73] Assignee: Toyota Jidosha kabushiki Kaisha, Aichi, Japan

[21] Appl. No.: 870,382

[22] Filed: Jun. 4, 1986

[30] Foreign Application Priority Data

| Jun. 27, 1985 | [JP] | Japan | 60-138990 |
| Jun. 27, 1985 | [JP] | Japan | 60-138991 |
| Jun. 28, 1985 | [JP] | Japan | 60-140417 |

[51] Int. Cl.⁴ ............................................. F02M 39/00
[52] U.S. Cl. ..................................... 123/447; 123/501
[58] Field of Search ............... 123/447, 500, 501, 502, 123/503, 357, 458

[56] References Cited

U.S. PATENT DOCUMENTS

| 3,587,547 | 6/1971 | Hussey | 123/447 |
| 3,635,016 | 1/1972 | Benson | 123/500 |
| 3,827,409 | 8/1974 | Oneill | 123/447 |
| 4,217,862 | 8/1980 | Fort | 123/501 |
| 4,421,088 | 12/1983 | Seilly | 123/447 |

FOREIGN PATENT DOCUMENTS

| 70213 | 12/1969 | Fed. Rep. of Germany. |
| 2907279 | 8/1980 | Fed. Rep. of Germany. |
| 3304605 | 8/1983 | Fed. Rep. of Germany. |
| 0056934 | 5/1981 | Japan | 123/447 |
| 57-81152 | 5/1982 | Japan | 123/447 |
| 59-58129 | 3/1984 | Japan. |
| 59-206667 | 11/1984 | Japan | 123/447 |
| 0006051 | 1/1985 | Japan | 123/501 |
| 60-53660 | 3/1985 | Japan | 123/457 |

Primary Examiner—Carl Stuart Miller
Attorney, Agent, or Firm—Oliff & Berridge

[57] ABSTRACT

An engine having a plurality of fuel injectors each being actuated by a piezoelectric element. The fuel injectors are connected to a common pressurized fuel accumulating chamber. A pressure sensor is arranged in the pressurized fuel accumulating chamber. A fuel feed pump is provided for feeding pressurized fuel into the pressurized fuel accumulating chamber. The amount of pressurized fuel discharged from the fuel feed pump is controlled in response to the output signal of the pressure sensor so that pressure in the pressurized fuel accumulating chamber becomes equal to a predetermined desired pressure.

20 Claims, 13 Drawing Sheets

FUEL INJECTION CONTROL DEVICE OF AN INTERNAL COMBUSTION ENGINE

BACKGROUND OF THE INVENTION

1. Field of the Invention

The present invention relates to a fuel injection control device of an internal combustion engine.

2. Description of the Related Art

A diesel engine is known in which fuel injectors are connected to a fuel feed pump via a fuel feed passage in which a pressurized fuel accumulating chamber is arranged. Pressurized fuel fed from the fuel feed pump is injected from the fuel injectors (U.S. Pat. No. 3,587,547). In this diesel engine, the fuel injection time and the amount of fuel injected from the fuel injectors are controlled in accordance with a change in the operating condition of the engine.

It is difficult, however, to obtain a satisfactory operation of the engine by controlling only the fuel injection time and the amount of fuel injected from the fuel injectors. That is, in a diesel engine, it is necessary to inject a large amount of fuel from the fuel injectors within a short time when the engine is operating under a heavy load. Contrary to this, when the engine is operating under a light load, it is necessary to prolong the injection time and inject a small amount of fuel little by little from the fuel injectors. Nevertheless, where the fuel injection is controlled by controlling only the fuel injection time and the amount of fuel fed from the fuel injectors, as in the diesel engine disclosed in U.S. Pat. No. 3,587,547, a large amount of fuel is injected in a short time when the engine is operating under a light load. As a result, problems occur in that noise from the engine is generated; the output power of the engine is decreased; and the fuel consumption is increased.

SUMMARY OF THE INVENTION

An object of the present invention is to provide a fuel injection control device capable of obtaining a satisfactory operation of the engine regardless of the operating state of the engine.

According to the present invention, there is provided a fuel injection control device of an internal combustion engine, comprising: a plurality of fuel injectors; a pressurized fuel accumulating chamber having a fixed volume and connected to the fuel injectors to feed pressurized fuel in the pressurized fuel accumulating chamber to the fuel injectors; a controllable fuel feed pump connected to the pressurized fuel accumulating chamber to feed pressurized fuel thereinto; drive means for controlling the amount of pressurized fuel discharged from the fuel feed pump; detecting means arranged in the pressurized fuel accumulating chamber to produce an output signal representing the pressure of the pressurized fuel in the pressurized fuel accumulating chamber; injection control means controlling the injection start timing and injection end timing of the fuel injectors in accordance with a change in an operating state of the engine; and pressure control means controlling the drive means in response to the output signal from the detecting means to equalize the pressure of the pressurized fuel in the pressurized fuel accumulating chamber to a predetermined pressure.

The present invention may be more fully understood from the description of preferred embodiments of the invention set forth below, together with the accompanying drawings.

BRIEF DESCRIPTION OF THE DRAWINGS

In the drawings:

FIGS. 10, 10(a)-(b) and 11 are flow charts for executing the calculation of the injection time in a case where a pilot injection is carried out;

DESCRIPTION OF THE PREFERRED EMBODIMENTS

Figure 1:
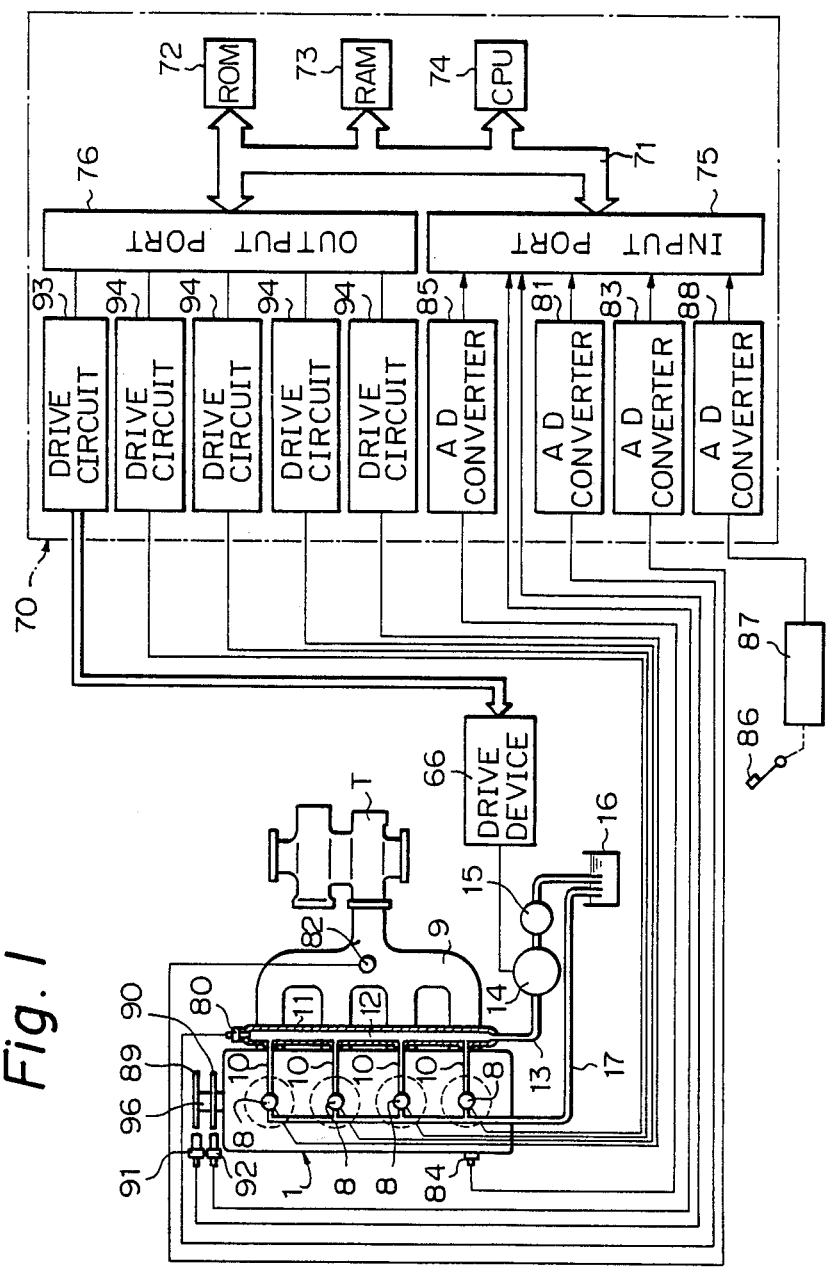
FIG. 1 is a schematically illustrated plan view of a diesel engine according to the present invention.
Figure 2:
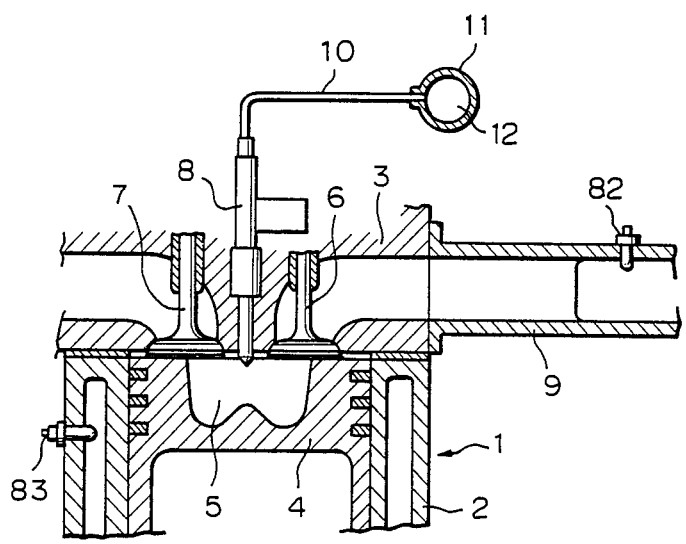
FIG. 2 is a cross-sectional side view of the diesel engine illustrated in FIG. 1.

Referring to FIGS. 1 and 2, reference numeral 1 designates a diesel engine body, 2 a cylinder block, 3 a cylinder head, 4 a piston, 5 a combustion chamber, 6 an intake valve, 7 an exhaust valve, 8 a fuel injector arranged in the combustion chamber 5, and 9 an intake manifold. The air inlet of the intake manifold 9 is connected to a turbocharger T. A fuel injector 8 is, provided for each engine cylinder, and is connected to a common pressurized fuel accumulating tube 11 via corresponding fuel feed conduits 10. Arranged inside the pressurized fuel accumulating tube 11 is a pressurized fuel accumulating chamber 12 having a fixed volume, and pressurized fuel in the pressurized fuel accumulating chamber 12 is fed to the fuel injectors 8 via the corresponding fuel feed conduits 10. The pressurized fuel accumulating chamber 12 is connected, via a fuel feed conduit 13, to the discharge port of a fuel feed pump 14. The amount of fuel discharged from the fuel feed pump 14 is controllable. The suction port of the fuel feed pump 14 is connected to the discharge port of a fuel pump 15, and the suction port of the fuel pump 15 is connected to a fuel reservoir tank 16. In addition, the fuel injectors 8 are connected to the fuel reservoir tank 16 via a fuel return conduit 17. The fuel pump 15 is provided for forcing fuel in the reservoir tank 16 into the fuel feed pump 14. Note, where the fuel feed pump 14 can draw in fuel from the fuel reservoir tank 16 under its own power, and thus does not need to use the fuel pump 15 for that purpose, the fuel pump 15 can be omitted from between the fuel feed pump 14 and the fuel reservoir tank 16. The fuel feed pump 14 is provided for discharging fuel having a high pressure, and the highly pressurized fuel discharged from the fuel feed pump 14 is stored in the pressurized fuel accumulating chamber 12.

Figure 3:
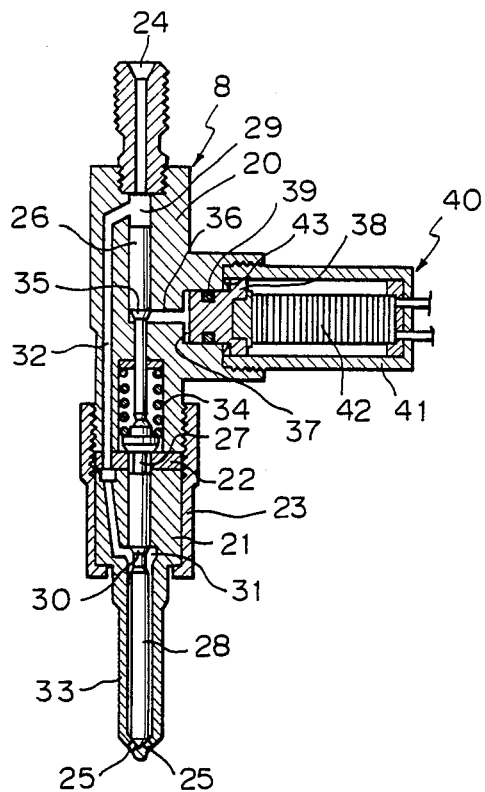
FIG. 3 is a cross-sectional side view of the fuel injector illustrated in FIG. 2.

FIG. 3 illustrates a cross-sectional side view of the fuel injector 8. Referring to FIG. 3, reference numeral 20 designates an injector body, 21 a nozzle, 22 a spacer, 23 a nozzle holder for fixing the nozzle 21 and the spacer 22 in the injector body 20, 24 a fuel inlet, and 25 nozzle bores formed on the tip of the nozzle 21. A control rod 26, a pressure pin 27, and a needle 28, which are arranged in series, are slidably inserted in the injector body 20, the spacer 22, and the nozzle 21. A fuel chamber 29 is formed above the control rod 26 and connected to the pressurized fuel accumulating chamber 12 via the fuel inlet 24 and the corresponding fuel feed conduit 10 (FIG. 2). Consequently, the pressure of the fuel, which is the same as that in the pressurized fuel accumulating chamber 12, acts on the fuel chamber 29, and this pressure of the fuel in the fuel chamber 29 acts on the top face of the control rod 26. The needle 28 has a conical shape pressure receiving face 30, and a needle pressure chamber 31 is formed around the pressure receiving face 30. The needle pressure chamber 31 is connected, on one hand, to the fuel chamber 29 via a fuel passage 32 and, on the other hand, to the nozzle bores 25 via an annular fuel passage 33 formed around the needle 28. A compression spring 34 for biasing the pressure pin 27 downward is inserted into the injector body 20, and the needle 28 is urged downward by the spring force of the compression spring 34. The control rod 26 has a conical shape pressure receiving face 35 at the intermediate portion thereof, and a control rod pressure chamber 36 is formed around the pressure receiving face 35. The control rod pressure chamber 36 is continuously connected to a cylinder 37 formed in and at a right angle to the injector body 20, and a piston 38 is slidably inserted into the cylinder 37. The piston 38 is provided with an O ring seal 39.

Figure 4:
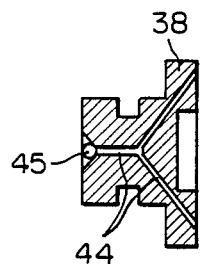
FIG. 4 is an enlarged cross-sectional plan view of the piston of the fuel injector illustrated in FIG. 3.

An actuating device 40 for actuating the piston 38 is mounted on the injector body 20. The actuating device 40 comprises a casing 41 fixed to the injector body 20, and a piezoelectric element 42 inserted between the casing 41 and the piston 38. The piezoelectric element 42 has a multi-layer construction formed by stacking a plurality of thin plates made of a piezoelectric material. When voltage is applied to the piezoelectric element 42, a longitudinal strain is generated in the piezoelectric element 42 due to the electrostrictive effect, that is, the piezoelectric element 42 expands in the longitudinal direction. The amount of expansion is small, for example, about 50 μm. However, the responsiveness of the expanding operation is good, in that the response time of the piezoelectric element 42 is about 80 μsec. When application of a voltage to the piezoelectric element 42 is stopped, the piezoelectric element 42 instantaneously contracts. As illustrated in FIG. 3, a disc spring 43 is inserted between the injector body 2 and the piston 38, and the piston 38 is urged towards the piezoelectric element 42 by the spring force of the disc spring 43. As illustrated in FIG. 4, a fuel passage 44 is formed in the piston 38, and a check ball 45 is arranged at the end of the fuel passage 44. Fuel is recirculated into the interior of the casing 41 in order to cool the piezoelectric element 42 by means of a recirculation device (not shown), and thus, the interior of the casing 41 is filled with fuel. When the amount of fuel in the control rod pressure chamber 36 is reduced, fuel in the casing 41 is fed into the control rod pressure chamber 36 via the fuel passage 44 and the check ball 45.

If the fuel in the control rod pressure chamber 36 is not pressurized, the downward force urging the needle 28 downward acts on the needle 28 due to the pressure of the fuel, which acts on the top face of the control rod 26, and the downward force caused by the compression spring 34 acts on the needle 28. In addition, the upward force acts on the needle 28 due to the pressure of the fuel, which acts on the conical pressure receiving face 30 of the needle 28. The diameter of the control rod 26, the spring force of the compression spring 34, and the area of the pressure receiving face 30 of the needle 28 are determined in such a manner that the sum of these downward forces is slightly larger than the sum of the upward force applied when the fuel in the control rod pressure chamber 36 is not pressurized. Consequently, the downward force normally acts on the needle 28, and thus the needle 28 normally closes the nozzle bores 25.

When a voltage is applied to the piezoelectric element 42, the piezoelectric element 42 expands in the longitudinal direction thereof, and thus the piston 38 is moved to the left in FIG. 3. As a result, the pressure of fuel in the control rod pressure chamber 36 is increased. At this time, since the upward force is acting on the pressure receiving face 35 of the control rod 26, the control rod 26 moves upward. As a result, the needle 28 also moves upward, and thus fuel is injected from the nozzle bores 25. The response time at this stage is about 80 μsec, and thus is extremely fast as mentioned above. When application of a voltage to the piezoelectric element 41 is stopped, the piezoelectric element 42 contracts, and thus the pressure of fuel in the control rod pressure chamber 36 is decreased. As a result, the control rod 26 and the needle 28 move downward, and thus the injection of fuel is stopped. The response time at this stage is also about 80 μsec, and thus extremely fast. As mentioned above, the diameter of the control rod 26, the spring force of the compression spring 34, and the area of the pressure receiving face 30 of the needle 28 are determined in such a manner that the sum of the downward forces acting on the needle 28 is slightly larger than the sum of the upward force acting thereon. Consequently, it is possible to cause the needle 28 to move upward by applying a small upward force to the pressure receiving face 35 of the control rod 26. That is, it is possible to cause the needle 28 to move upward by slightly increasing the pressure of the fuel in the control rod pressure chamber 36. Consequently, only a small amount of electrical power need be applied to the piezoelectric element 42 for causing the upward movement of the needle 28, and therefore, it is possible to greatly reduce the consumption of power.

Figure 5:
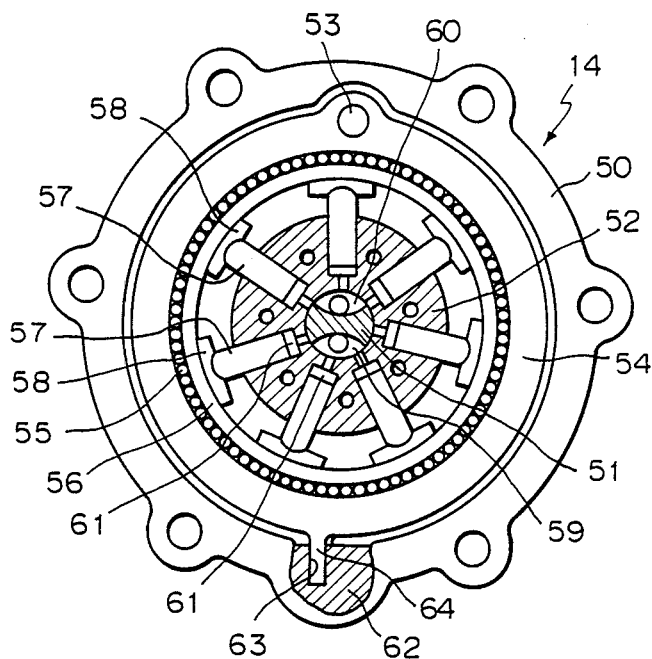
FIG. 5 is a cross-sectional side view of the fuel feed pump illustrated in FIG. 1.
Figure 6:
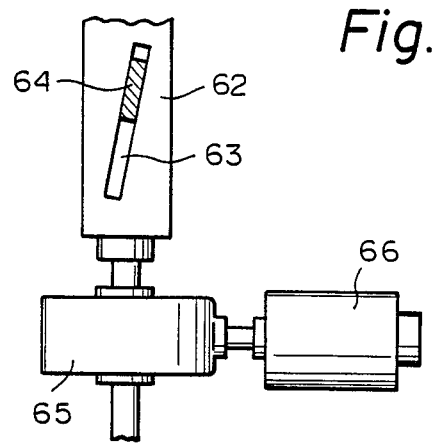
FIG. 6 is a plan view of the control lever and the drive device for the fuel feed pump illustrated in FIG. 5.

FIGS. 5 and 6 illustrate an example of the fuel feed pump 14; note, the amount of fuel discharged therefrom is controllable. Referring to FIG. 5, the fuel feed pump 14 comprises a pump casing 50, a stationary shaft 51 rigidly supported by the pump casing 50, a rotor 52 rotating around the stationary shaft 51, a stator 54 pivotally connected to the pump casing 50 by means of a pivot pin 53, and a ring 56 rotatably supported within and by the stator 54 via bearings 55. The rotor 52 is provided with a plurality of pistons 57 which are radially arranged, and shoes 58 which move together with the radial pistons 57 are inserted between the ring 56 and the radial pistons 57. The radial pistons 57 are rotated about the stationary shaft 51 by the rotation of the rotor 52. During this rotation, the shoes 58 slide on the inner circumferential wall of the ring 56 and, at the same time, the ring 56 rotates due to the frictional force generated between the ring 56 and the shoes 58. A suction port 59 and a discharge port 60 are formed in the stationary shaft 51. The suction port 59 is connected to the discharge port of the fuel pump 15 (FIG. 1), and the discharge port 60 is connected to the pressurized fuel accumulating chamber 12 (FIG. 1). Each of the cylinder chambers 61 of the radial pistons 57 opens alternately to the suction port 59 and the discharge port 60. The radial pistons 57 move radially outwardly during the time that the cylinder chambers 61 are open to the suction port 59. Consequently, at this time, fuel is sucked into the cylinder chambers 61. Conversely, the radial pistons 57 move radially inwardly during the time that the cylinder chambers 61 are open to the discharge port 60. At this time, fuel in the cylinder chambers 61 is forced into the discharge port 60. The amount of fuel discharged into the discharge port 60 depends on the stroke of the radial pistons 57, which is, in turn, determined by the position of the stator 54. Consequently, by swinging the stator 54 about the pivot pin 53, it is possible to control the amount of fuel discharged from the fuel feed pump 14, and accordingly, it is possible to control the pressure of the fuel stored in the pressurized fuel accumulating chamber 12 (FIG. 1).

Referring to FIGS. 5 and 6, a control lever 62 able to slide in the axial direction of the stationary shaft 51 is arranged in the lower portion of the pump casing 50. The control lever 62 is provided with an elongated groove 63 extending obliquely with respect to the axis of the control lever 62, and an arm 64 formed integrally on the lower portion of the stator 54 is slidably inserted into the groove 63. Consequently, when the control lever 62 is caused to move in the axial direction thereof, the stator 54 swings about the pivot pin 53, and thus the amount of fuel discharged from the fuel feed pump 14 is controlled. The control lever 62 is connected to a drive device 66 via a reduction gear apparatus 65. In this embodiment, the drive device 66 is formed by a stepper motor. Note, another drive means such as a linear solenoid may be used as the drive device 66 in place of the stepper motor. The control lever 62 is moved in the axial direction by the drive device 66, and thus the amount of fuel discharged from the fuel feed pump 14, and accordingly the pressure of the fuel in the pressurized fuel accumulating chamber 12, is controlled by the drive device 66.

Turning to FIG. 1, an electronic control unit 70 is provided for controlling the fuel injectors 8 and the drive device 66. The electronic control unit 70 is constructed as a computer and comprises a ROM (read only memory) 72, a RAM (random access memory) 73, CPU (microprocessor, etc.) 74, an input port 75, and an output port 76. The ROM 72, the RAM 73, the CPU 74, the input port 75, and the output port 76 are interconnected to each other via a bidirectional bus 71.

As illustrated in FIG. 1, a fuel pressure sensor 80 for detecting the pressure of the fuel in the pressurized fuel accumulating chamber 12 is attached to the end of the pressurized fuel accumulating tube 11. The fuel pressure sensor 80 produces an output voltage proportional to the pressure of the fuel in the pressurized fuel accumulating chamber 12. The fuel pressure sensor 80 is connected to the input port 75 via an AD converter 81. A pressure sensor 82 is arranged in the intake manifold 9 for detecting pressure therein. The pressure sensor 82 produces an output voltage proportional to pressure in the intake manifold 9, and is connected to the input port 75 via an AD converter 83. A temperature sensor 84 for detecting the temperature of the engine coolant is attached to the engine body 1. The temperature sensor 84 produces an output voltage proportional to the temperature of the engine coolant, and is connected to the input port 75 via an AD converter 85. A load sensor 87 producing an output voltage proportional to the amount of depression of an accelerator pedal 86 is attached to the accelerator pedal 86, and is connected to the input port 75 via an AD converter 88. A pair of discs 89 and 90 are mounted on the crankshaft 96 of the engine, and a pair of crank angle sensors 91 and 92 are arranged to face the toothed outer peripheries of the discs 89 and 90, respectively. The crank angle sensor 91 produces an output pulse indicating, for example, that No. 1 cylinder is at top dead center in the intake stroke. Consequently, the operation of each fuel injector 8 is determined on the basis of the pulses output by the crank angle sensor 91. The crank angle sensor 92 produces an output pulse every time the crankshaft of the engine rotates by a predetermined angle. Consequently, the engine speed can be calculated from the pulses output by the crank angle sensor 92. These crank angle sensors 91 and 92 are connected to the input port 75. The output port 76 is connected, on one hand, to the drive device 66 formed by a stepper motor via a drive circuit 93 and, on the other hand, to the piezoelectric elements 42 of the fuel injectors 8 via corresponding drive circuits 94.

The operation of the fuel injection control device will be hereinafter described with reference to FIGS. 7 through 14.

Figure 7:
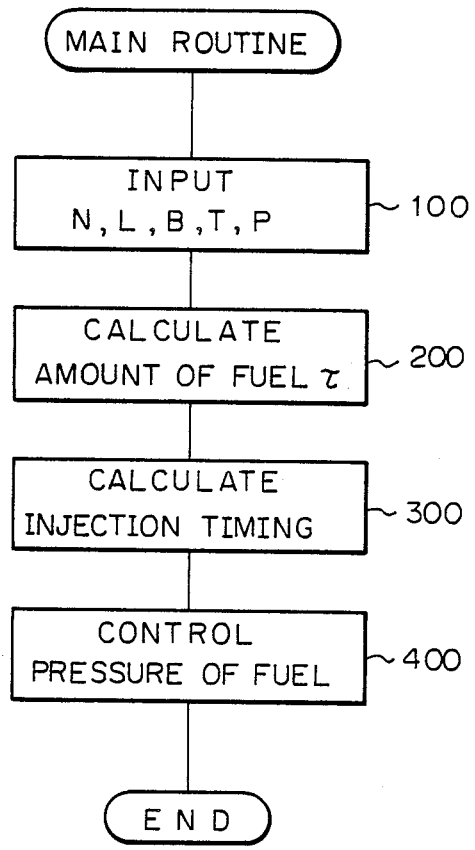
FIG. 7 is a flow chart illustrating a main routine for executing the fuel injection control according to the present invention.
Figure 9:
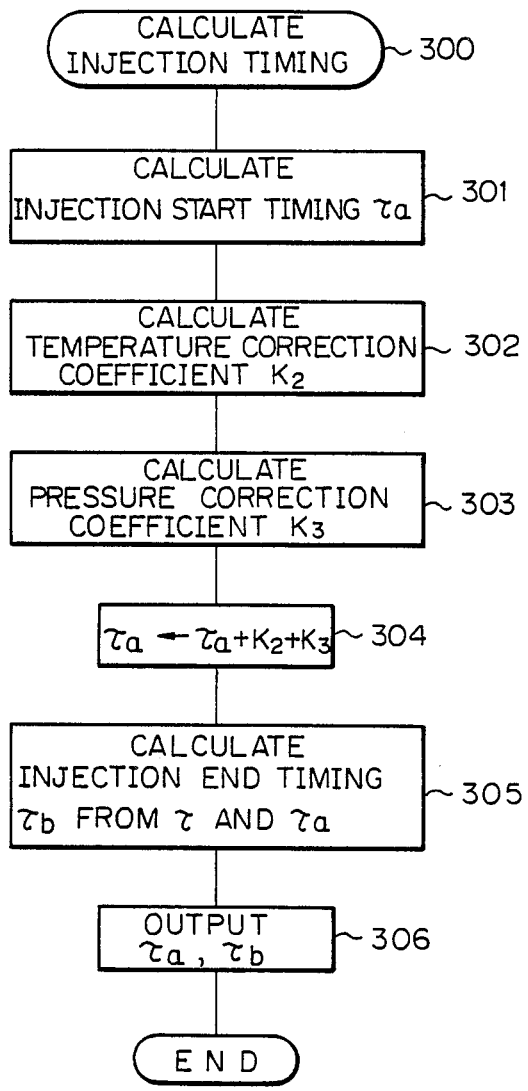
FIG. 9 is a flow chart for executing the calculation of the injection timing in a case where a pilot injection is not carried out.
Figure 10A:
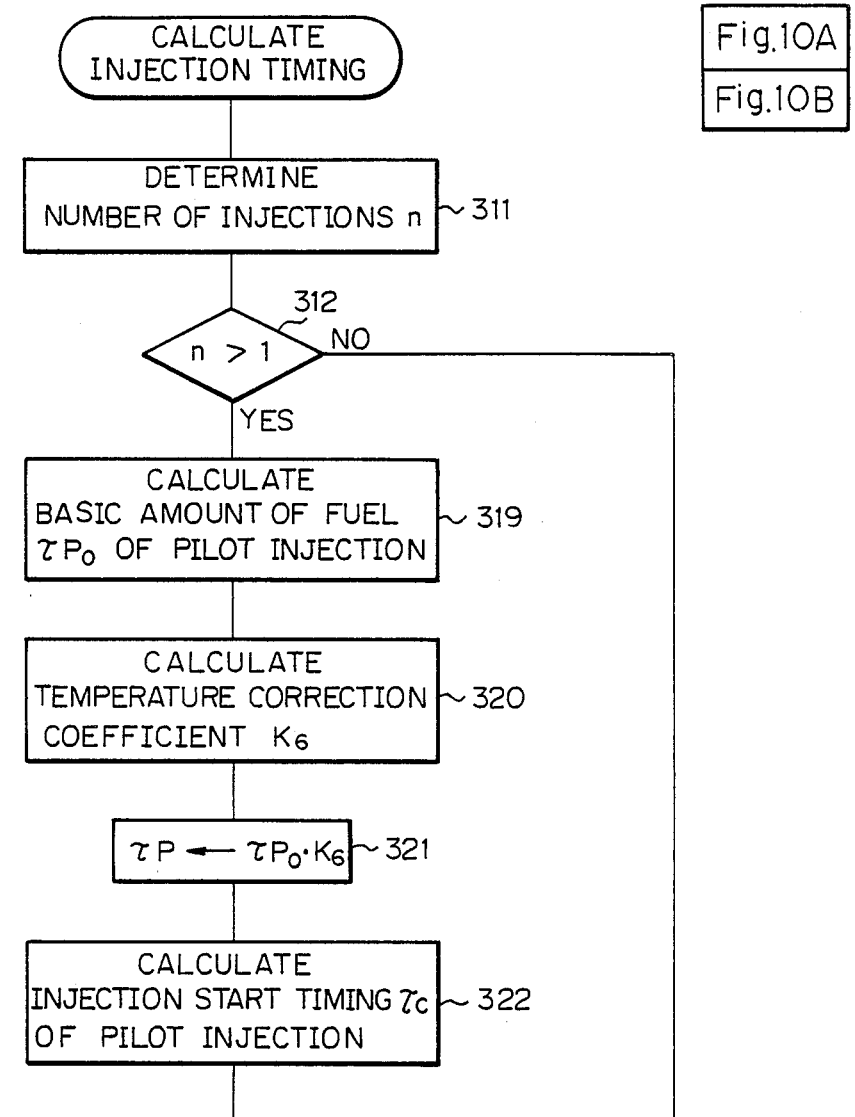
Figure 10B:
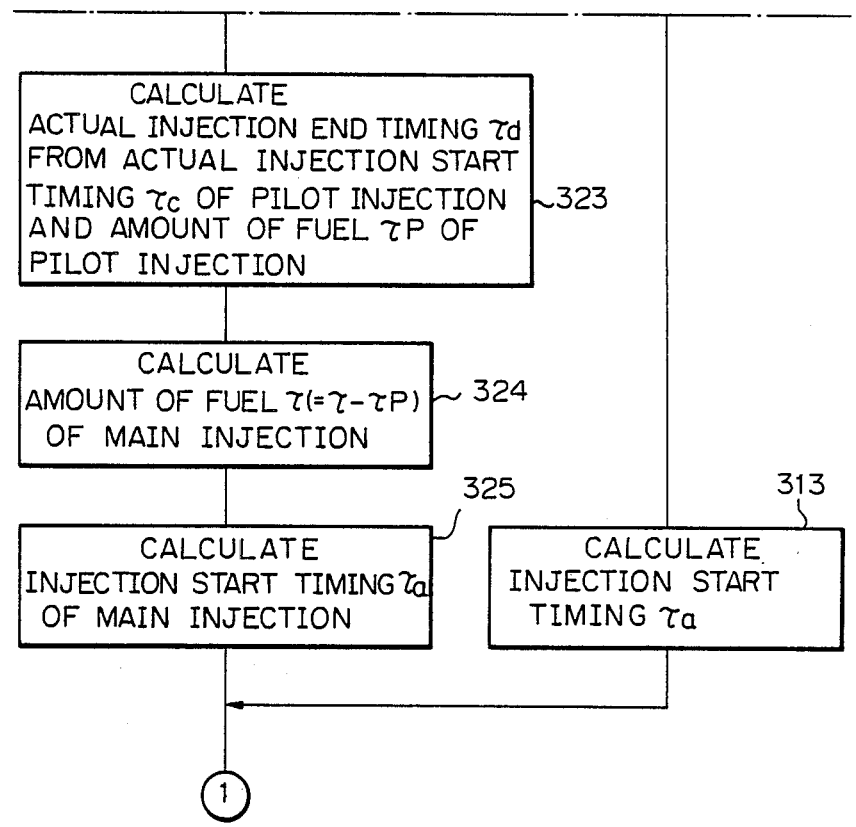
Figure 11:
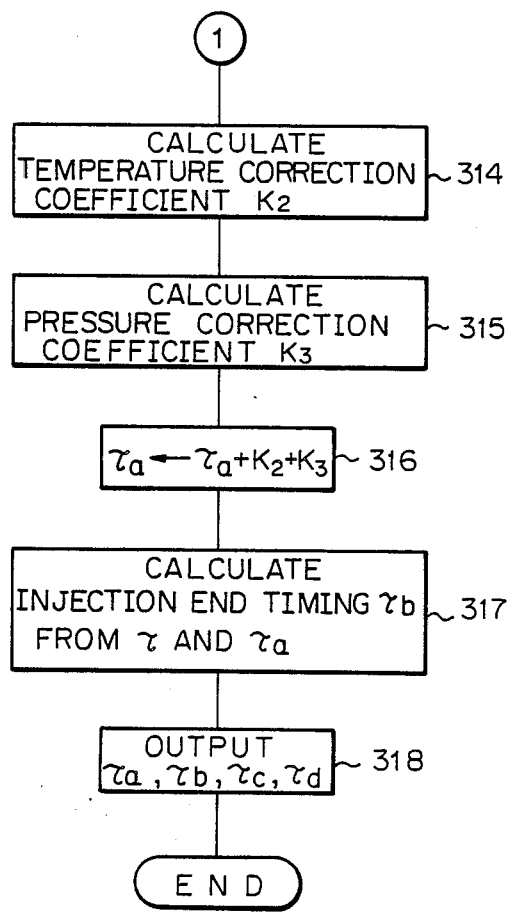
Figure 12:
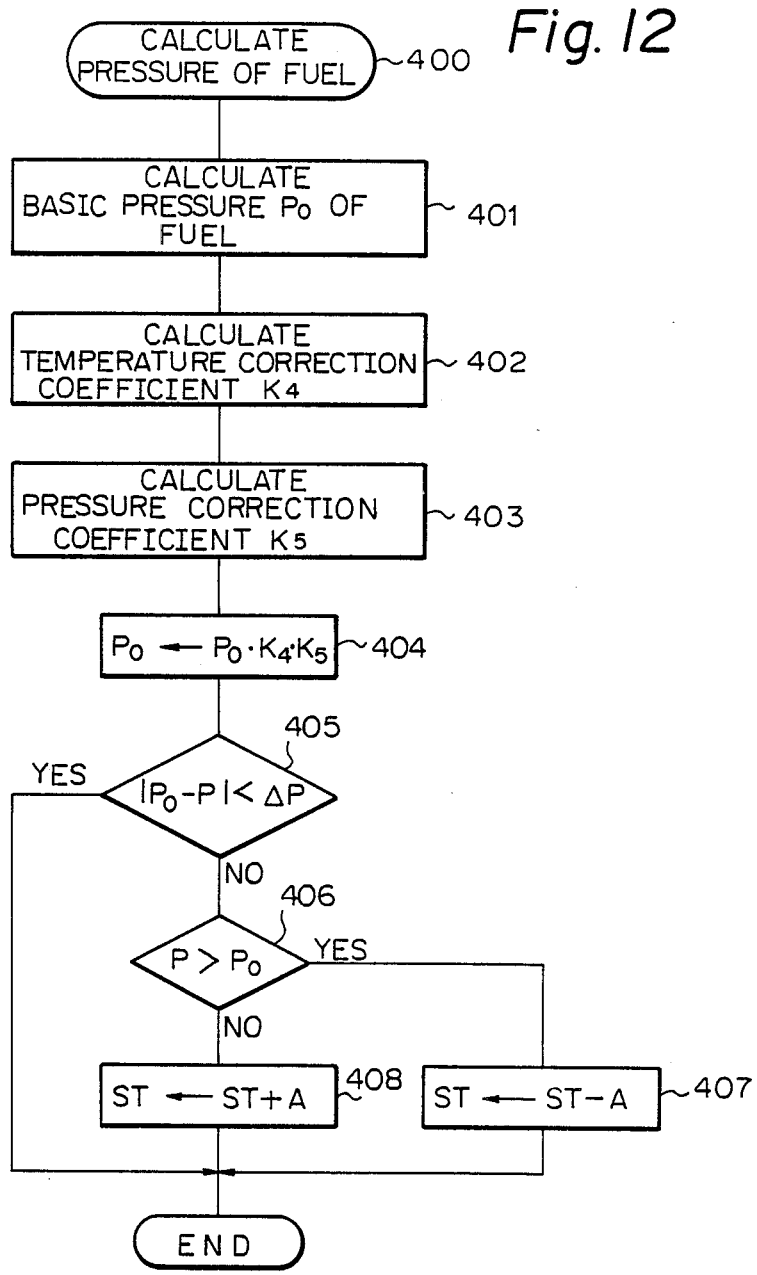
FIG. 12 is a flow chart for controlling the pressure of fuel in the pressurized fuel accumulating chamber.

FIG. 7 illustrates a main routine which is processed by sequential interruptions executed at a predetermined crank angle. Referring to FIG. 7, in step 100, the output signal of the crank angle sensor 92, the output signal of the load sensor 87 representing the depression L of the accelerator pedal 86, the output signal of the pressure sensor 82 representing the pressure B in the intake manifold 9, the output signal of the temperature sensor 84 representing the temperature T of the engine coolant, and the output signal of the pressure sensor 80 representing the pressure P of fuel in the pressurized fuel accumulating chamber 12 are successively input to the CPU 74, and the engine speed N is calculated from the output signal of the crank angle sensor 92. Then, the engine speed N, the depression L of the accelerator pedal, the pressure B, the temperature T, and the pressure P are stored in the RAM 73. Subsequently, in step 200, the amount of fuel $\tau$ to be injected is calculated, and then, in step 300, the injection timing is calculated. Control of the pressure of the fuel P is then carried out in step 400. The calculation of the amount of fuel $\tau$ in step 200 is illustrated in FIG. 8, the calculation of the injection time in step 300 is illustrated in FIGS. 9 through 11, and the control of the pressure of the fuel in step 400 is illustrated in FIG. 12.

Figure 8:
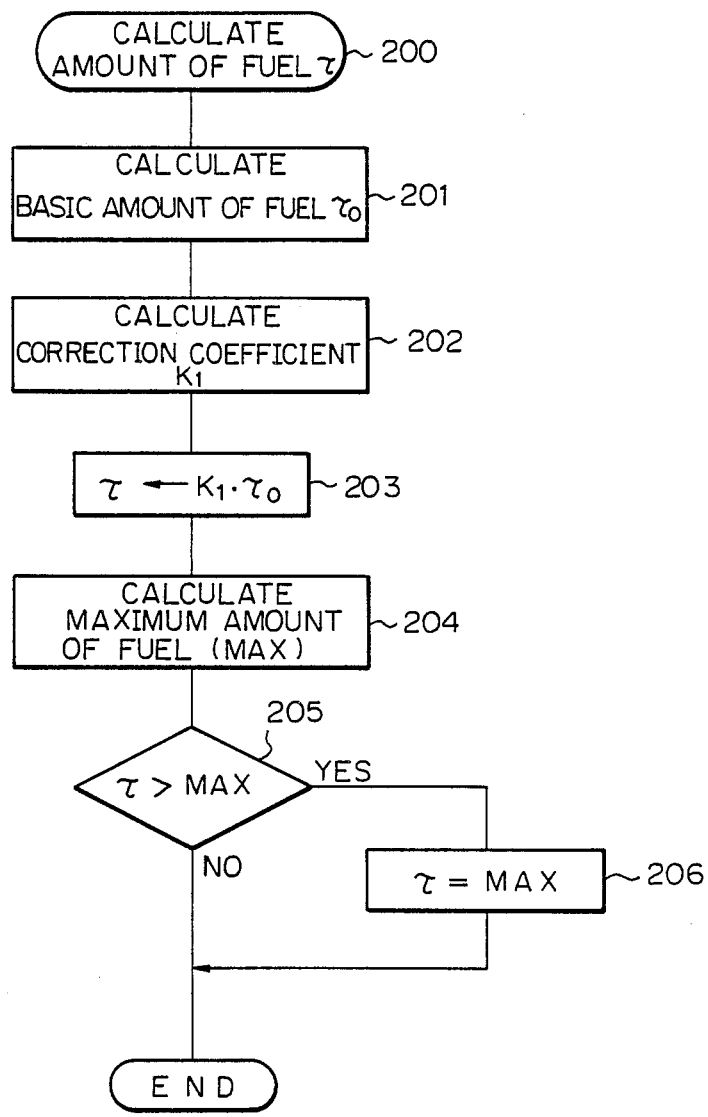
FIG. 8 is a flow chart for executing the calculation of the amount of fuel to be injected.

FIG. 8 illustrates a flow chart for calculating the amount of fuel $\tau$ to be injected.

Figure 13:
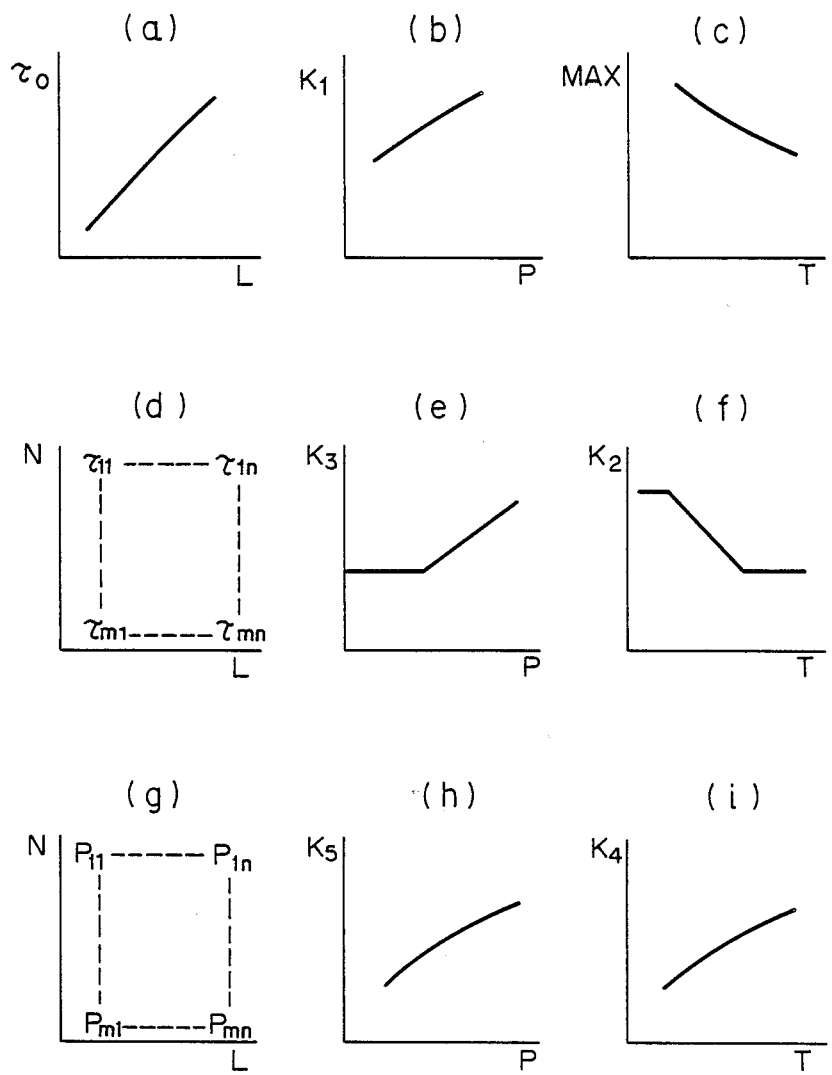
FIGS. 13(a)-(i) diagrammatically illustrate the correction coefficients, etc.
Figure 14:
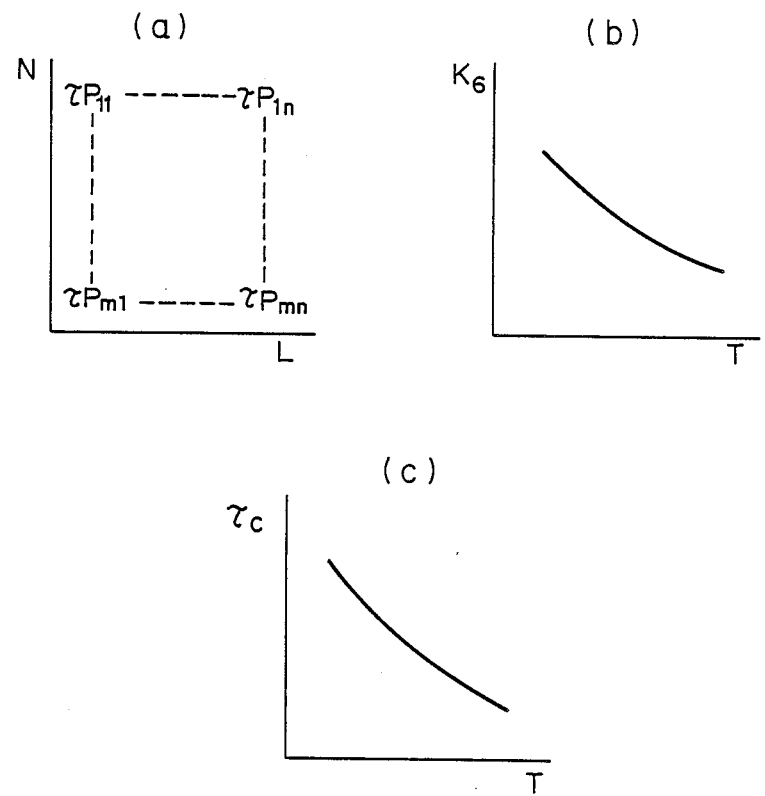
FIGS. 14(a)-(c) diagrammatically illustrate the correction coefficients, etc.

Referring to FIG. 8, in step 201, the basic amount of fuel $\tau_0$ to be injected is calculated from the amount of depression of the accelerator pedal 86, that is, the engine load L. FIG. 13($a$) illustrates the relationship between the basic amount of fuel $\tau_0$ and the engine load L, and this relationship is stored in the ROM 72. Then, in step 202, a pressure correction coefficient $K_1$ is calculated from the pressure B in the intake manifold 9. This pressure correction coefficient $K_1$ is used for correcting the basic amount of fuel $\tau_0$ when the turbocharger T is operated. As illustrated in FIG. 13(b), the pressure correction coefficient $K_1$ is increased as the pressure B becomes high. The relationship illustrated in FIG. 13(b) is stored in the ROM 72.

Then, in step 203, the amount of fuel $\tau$ to be injected is calculated by using the equation $\tau = K_1 \cdot \tau_0$, and, in step 204, the maximum amount of fuel MAX to be injected is calculated from the temperature T of the engine coolant. As illustrated in FIG. 13(c), the maximum amount of fuel MAX is reduced as the temperature T is increased, to prevent the generation of smoke. The relationship illustrated in FIG. 13(c) is stored in the ROM 72.

Then, in step 205, it is determined whether or not the amount of fuel $\tau$ is larger than the maximum amount of fuel MAX. If $\tau > $ MAX, the routine goes to step 206, and MAX is put into $\tau$. Consequently, the maximum amount of fuel is restricted by the temperature T of the engine coolant.

FIG. 9 illustrates a flow chart for calculating the injection timing where a pilot injection is not carried out.

Referring to FIG. 9, in step 301, the injection start timing $\tau_a$ is calculated from the engine speed N and the engine load L. The relationship of the injection start timing $\tau_{11}, \ldots \tau_{mn}$, the engine speed N, and the engine load L as illustrated in FIG. 13(d) is stored in the ROM 72 in the form of a map, and the injection start timing $\tau_a$ is calculated from this map. Then, in step 302, the temperature correction coefficient $K_2$ is calculated from the temperature T of the engine coolant. As illustrated in FIG. 13(f), the temperature correction coefficient $K_2$ is reduced as the temperature T is increased. The relationship illustrated in FIG. 13(f) is stored in the ROM 72. Then, in step 303, the pressure correct coefficient $K_3$ is calculated from the pressure B in the intake manifold 9. This pressure correction coefficient $K_3$ is used for correcting the injection start timing $\tau_a$ when the turbocharger T is operated. As illustrated in FIG. 13(e), the pressure correction coefficient $K_3$ is increased as the pressure B becomes high. The relationship illustrated in FIG. 13(e) is stored in the ROM 72. Then, in step 304, the correction coefficients $K_2$ and $K_3$ are added to the injection start timing $\tau_a$, and thus, the actual injection start timing $\tau_a$ is obtained. This actual injection timing $\tau_a$ is increased, i.e., advanced, as the correction coefficients $K_2$ and $K_3$ are increased. Then, in step 305, the actual injection end timing $\tau_b$ is calculated from the actual injection start timing $\tau_a$ and the amount of fuel $\tau$ calculated in the routine illustrated in FIG. 8. Then, in step 306, the actual injection start timing $\tau_a$ and the actual injection end timing $\tau_b$ thus obtained are output to the output port 76, and the injection of the fuel injectors 8 is controlled on the basis of $\tau_a$ and $\tau_b$.

FIGS. 10 and 11 illustrated a flow chart for calculating the injection timing where a pilot injection is carried out.

Referring to FIGS. 10 and 11, in step 311 (FIG. 10), the number of injections n is determined. Where, n=1 indicates the case where only the main injection is carried out, and n=2 indicates the case where the pilot injection is once carried out before the main injection is carried out. In addition, n=3 indicates the case where the pilot injection is carried out twice before the main injection is carried out. Roughly speaking, the pilot injection is carried out when the engine is operating under a light load at a low speed. That is, in step 311, the number of injections n is determined from the engine speed N, the engine load L, and other parameters. Then, in step 312, it is determined whether n is larger than 1. If n=1, the routine goes to step 313. In step 313, the injection start timing $\tau_a$ is calculated from the engine speed N and the engine load L. The relationship of the injection start timing $\tau_{11}, \ldots \tau_{mn}$, the engine speed N, and the engine load L as illustrated in FIG. 13(d), is stored in the ROM 72 in the form of a map, and the injection start timing $\tau_a$ is calculated from this map. Then, in step 314 (FIG. 11), the temperature correction coefficient $K_2$ is calculated from the temperature T of the engine coolant. As illustrated in FIG. 13(f), the temperature correction coefficient $K_2$ is reduced as the temperature T is increased. The relationship illustrated in FIG. 13(f) is stored in the ROM 72. Then, in step 315, the pressure correct coefficient $K_3$ is calculated from the pressure B in the intake manifold 9. This pressure correction coefficient $K_3$ is used for correcting the injection start timing $\tau_a$ when the turbocharger T is operated. As illustrated in FIG. 13(e), the pressure correction coefficient $K_3$ is increased as the pressure B becomes high. The relationship illustrated in FIG. 13(e) is stored in the ROM 72. Then, in step 316, the correction coefficients $K_2$ and $K_3$ are added to the injection start timing $\tau_a$, and thus the actual injection start timing $\tau_a$ is obtained. This actual injection timing $\tau_a$ is increased, i.e., advanced, as the correction coefficients $K_2$ and $K_3$ are increased. Then, in step 317, the actual injection end timing $\tau_b$ is calculated from the actual injection start timing $\tau_a$ and the amount of fuel $\tau$ calculated in the routine illustrated in FIG. 8. Then, in step 318, the actual injection start timing $\tau_a$ and the actual injection end timing $\tau_b$ thus obtained are output to the output port 76, and the injection of the fuel injectors 8 is controlled on the basis of $\tau_a$ and $\tau_b$. At this time, only the main injection is carried out.

Contrary to this, when it is determined in step 312 (FIG. 10) that n is larger than L, the routine goes to step 319, and the basic amount of fuel $\tau P_0$ of the pilot injection is calculated from the engine speed N and the engine load L. The relationship of the basic amount of fuel $\tau P_0$ of the pilot injection, the engine speed N, and the engine load L as illustrated in FIG. 14(a) is stored in the ROM 72 in the form of a map. Consequently, in step 319, the basic amount of fuel $\tau P_0$ of the pilot injection is calculated from this map. Then, in step 320, the temperature correction coefficient $K_6$ is calculated from the temperature T of the engine coolant. As illustrated in FIG. 14(b), the temperature correction coefficient $K_6$ is increased as the temperature T of the engine coolant is reduced. The relationship illustrated in FIG. 14(b) is stored in the ROM 72. Then, in step 321, the amount of fuel $\tau P$ of the pilot injection is calculated by the equation $\tau P = \tau P_0 \cdot K_6$. Therefore, from step 321, it will be understood that, if the basic amount of fuel $\tau P_0$ of the pilot injection is constant, the amount of fuel $\tau P$ of the pilot injection is increased as the temperature T of the engine coolant is reduced. Then, in step 322, the actual injection start timing $\tau_c$ of the pilot injection is calculated from the temperature T of the engine coolant. As illustrated in FIG. 14(c), the actual injection start timing $\tau_c$ of the pilot injection is increased as the temperature T of the engine coolant is reduced. That is, the actual injection start timing $\tau_c$ of the pilot injection is advanced as the temperature T of the engine coolant is reduced. The relationship illustrated in FIG. 14(c) is stored in the ROM 72. Then, in step 323, the actual injection end timing $\tau_d$ of the pilot injection is calculated from the actual injection start timing $\tau_c$ of the pilot injection and the amount of fuel $\tau P$ of the pilot injection. Then, in step 324, the amount of fuel $\tau$ of the main injection is calculated by subtracting the amount of fuel $\tau P$ of the pilot injection from the amount of fuel $\tau$ obtained by the routine illustrated in FIG. 8. Then, in step 325, the injection start timing $\tau_a$ is calculated from the engine speed N and the engine load L.

Figure 15:
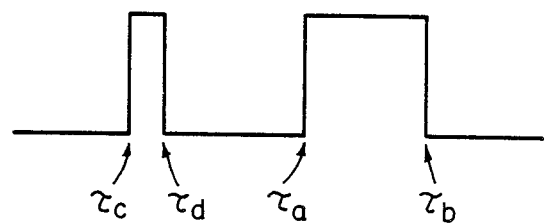
FIG. 15 is a diagram illustrating the injection timing.

Then, in step 316 (FIG. 11), the actual injection start timing $\tau_a$ of the main injection is calculated, and in step 317, the actual injection end timing $\tau_b$ of the main injection is calculated. Subsequently, in step 318, the actual injection start timing $\tau_a$ of the main injection, the actual injection end timing $\tau_b$ of the main injection, the actual injection start timing $\tau_c$ of the pilot injection, and the actual injection end timing $\tau_d$ of the pilot injection are output to the output port 76. As a result, as illustrated in FIG. 15, the pilot injection is carried out during the time between $\tau_c$ and $\tau_d$, and the main injection is carried out during the time between $\tau_a$ and $\tau_b$.

As the temperature of the engine drops, the fuel injected from the fuel injectors 8 is not properly atomized, and thus, it takes a longer time for a complete atomization of the fuel. Consequently, it is preferable that the injection start timing of pilot injection be advanced as the engine temperature drops. In addition, as mentioned above, as the engine temperature drops, the fuel injected from the fuel injectors 8 is not properly atomized, and consequently, it is preferable that the amount of fuel of the pilot injection be increased as the engine temperature drops. In the present invention, as mentioned above, since the injection start timing of the pilot injection is advanced as the engine temperature drops, it is possible to obtain a good combustion and prevent noise and vibration from the engine.

FIG. 12 illustrates a flow chart for controlling the pressure P of fuel in the pressurized fuel accumulating chamber 12.

Referring to FIG. 12, in step 401, the basic pressure $P_0$ of fuel in the pressurized fuel accumulating chamber 12 is calculated from the engine speed N and the engine load L. The relationship of the basic pressure of fuel $P_{11} \ldots P_{mn}$, the engine speed N, and the engine load L as illustrated in FIG. 13(g) is stored in the ROM 72 in the form of a map. Consequently, in step 401, the basic pressure $P_0$ of the fuel is calculated from this map. Then, in step 402, the temperature correction coefficient $K_4$ is calculated from the temperature T of the engine coolant. As illustrated in FIG. 13(i), the temperature correction coefficient $K_4$ is increased as the temperature T of the engine coolant is increased. The relationship illustrated in FIG. 13(i) is stored in the ROM 72. Then, in step 403, the pressure correction coefficient $K_5$ is calculated from the pressure B in the intake manifold 9. The pressure correction coefficient $K_5$ is used for correcting the basic pressure $P_0$ of fuel when the turbocharger T is operated. As illustrated in FIG. 13(h), the pressure correction coefficient $K_5$ is increased as the pressure B in the intake manifold 9 is increased. The relationship illustrated in FIG. 13(h) is stored in the ROM 72. Then, in step 404, the desired pressure $P_0$ of fuel in the pressurized fuel accumulating chamber 12 is calculated by multiplying the basic pressure $P_0$ of the fuel obtained in step 401 by the correction coefficients $K_4$ and $K_5$. The desired pressure $P_0$ of the fuel is increased as the temperature T of the engine coolant is increased. In addition, the desired pressure $P_0$ of the fuel is also increased as the pressure P in the intake manifold 9 is increased. Then, in step 405, it is determined whether the absolute value $|P_0-P|$ of the difference between the desired pressure $P_0$ and the present pressure P of fuel in the pressurized fuel accumulating chamber 12 is smaller than a predetermined value $\Delta P$. If $|P_0-P| \geq \Delta P$, the routine goes to step 406, and it is determined whether the present pressure P of the fuel is higher than the desired pressure $P_0$ of the fuel. If $P > P_0$, the routine goes to step 407, and a predetermined step number A is subtracted from the step position ST of the stepper motor forming the drive device 66. As a result, since the control lever 62 (FIGS. 5 and 6) of the fuel feed pump 14 is caused to move in a direction wherein the amount of fuel discharged from the fuel feed pump 14 is reduced, the pressure of fuel in the pressurized fuel accumulating chamber 12 is instantaneously reduced. Contrary to this, if $P \leq P_0$, the routine goes to step 408 from step 406, and a predetermined step number A is added to the step position ST of the stepper motor 66. As a result, since the control lever 62 of the fuel feed pump 14 is caused to move in a direction wherein the amount of fuel discharged from the fuel feed pump 14 is increased, the pressure of fuel in the pressurized fuel accumulating chamber 12 is instantaneously increased. If it is determined, however, in step 405, that $|P_0-P|$ is smaller than $\Delta P$, the processing routine is completed. At this time, the stepper motor 66 remains stationary. Therefore, the pressure P of fuel in the pressurized fuel accumulating chamber 12 is maintained at the desired pressure $P_0$.

According to the present invention, it is possible to control the injection rate of fuel injected from the fuel injectors so that this rate becomes equal to an injection rate which is the optimum for an engine operating state by controlling the pressure of fuel in the pressurized fuel accumulating chamber. As a result, it is possible to obtain a good combustion regardless of an engine operating state, and thus it is possible to prevent noise from the engine and to improve the output power of the engine and the fuel consumption. In addition, a large force is not required for controlling the amount of fuel discharged from the fuel feed pump. Consequently, since it is possible to use a small sized drive device in order to control the amount of fuel discharged from the fuel feed pump, there is an advantage that the power consumption of the drive device is greatly reduced.

While the invention has been described by reference to specific embodiments chosen for purposes of illustration, it should be apparent that numerous modifications could be made thereto by those skilled in the art without departing from the basic concept and scope of the invention.

I claim:

1. A fuel injection control device of an internal combustion engine, comprising:
    a plurality of fuel injectors, each comprising a nozzle bore, a needle having a pressure receiving face, said pressure receiving face being urged to move away from said nozzle bore by the pressure of fuel which acts on said pressure receiving face, a spring urging said needle towards said nozzle bore to normally close said nozzle more, a control rod arranged in series relative to said needle and having an outer end and an inner end connected to said needle, said outer end of said control rod receiving the pressure of fuel to urge said needle against said nozzle bore, and actuating means for urging said control rod to move said needle away from said nozzle bore in order to inject fuel from said nozzle bore, said actuating means comprising a pressure receiving face formed on said control rod, a control rod pressure chamber formed around said pressure receiving face of said control rod, said control rod pressure chamber being a confined chamber and an actuator for pressurizing fuel in said control rod pressure chamber to urge said control rod, said actuator comprising a piston for pressurizing the fuel in said control rod pressure chamber, and a piezoelectric element for actuating said piston;

a pressurized fuel accumulating chamber having a fixed volume and connected to said fuel injectors to feed pressurized fuel in said pressurized fuel accumulating chamber into said fuel injectors;

a controllable fuel feed pump connected to said pressurized fuel accumulating chamber to feed pressurized fuel thereinto;

drive means for controlling the amount of pressurized fuel discharged from said fuel feed pump;

detecting means arranged in said pressurized fuel accumulating chamber to produce an output signal representing the pressure of the pressurized fuel in said pressurized fuel accumulating chamber;

injection control means controlling an injection start timing and injection end timing of said fuel injectors in accordance with a change in an operating state of said engine; and pressure control means controlling said drive means in response to the output signal of said detecting means to equalize the pressure of the pressurized fuel in said pressurized fuel accumulating chamber to a predetermined pressure.

2. A fuel injection control device of an internal combustion engine, comprising:

a plurality of fuel injectors;

a pressurized fuel accumulating chamber having a fixed volume and connected to said fuel injectors to feed pressurized fuel in said pressurized fuel accumulating chamber into said fuel injectors;

a controllable fuel feed pump connected to said pressurized fuel accumulating chamber to feed pressurized fuel thereinto, said fuel feed pump comprising: a plurality of radially arranged pistons having variable strokes, the amount of fuel which is discharged from said fuel feed pump being changed by the stroke of said radially arranged pistons, a pump casing, a stationary shaft fixed to said pump casing, a rotor rotated about said stationary shaft, and having said radially arranged pistons radially outwardly movable therein, a stator pivotally connected to said pump casing and having a cylindrical inner wall which is in contact with outer ends of said radially arranged pistons to move said radially arranged pistons radially, a suction port formed in said stationary shaft, a discharge port formed in said stationary shaft, and cylinder chambers defined by said radially arranged pistons and alternately opening into said suction port and said discharge port, said drive means causing said stator to swing relative to said pump housing to change the stroke of said radially arranged pistons;

injection control means controlling an injection start timing and injection end timing of said fuel injectors in accordance with a change in an operating state of said engine; and pressure control means controlling said drive means in response to the output signal of said detecting means to equalize the pressure of the pressurized fuel in said pressurized fuel accumulating chamber to a predetermined pressure.

3. A fuel injection control device of an internal combustion engine, comprising:

a plurality of fuel injectors;

a pressurized fuel accumulating chamber having a fixed volume and connected to said fuel injectors to feed pressurized fuel in said pressurized fuel accumulating chamber into said fuel injectors;

a controllable fuel feed pump connected to said pressurized fuel accumulating chamber to feed pressurized fuel thereinto;

drive means for controlling the amount of pressurized fuel discharged from said fuel feed pump;

detecting means arranged in said pressurized fuel accumulating chamber to produce an output signal representing the pressure of the pressurized fuel in said pressurized fuel accumulating chamber;

injection control means controlling an injection start timing and injection end timing of a pilot injection and of a main injection which follow said pilot injection of said fuel injectors in accordance with a change in an operating state of said engine, said injection control means comprising an engine speed sensor detecting the rotating speed of said engine, a load sensor detecting the load of said engine, and a memory which stores data: representing the relationship between an engine speed and a total amount of fuel to be injected; representing the relationship among an engine load, the engine speed and the injection start timing of said main injection; representing the relationship among the engine load, the engine speed and an amount of fuel of said pilot injection; and representing the injection start timing of said pilot injection, said total amount of fuel being calculated from the data stored in the memory on the basis of the engine load, the injection start timing of said main injection being calculated from the data stored in said memory on the basis of the engine load and the engine speed, the injection end timing of said main injection being calculated from said total amount of fuel, said amount of fuel of said pilot injection and said injection start timing of said main injection, the amount of fuel of said pilot injection being calculated from the data stored in said memory on the basis of the engine load and the engine speed, the injection end timing of said pilot injection being calculated from the amount of fuel of said pilot injection and the injection start timing of said pilot injection; and pressure control means controlling said drive means in response to the output signal of said detecting means to equalize the pressure of the pressurized fuel in said pressurized fuel accumulating chamber to a predetermined pressure.

4. A fuel injection control device of an internal combustion engine, comprising:

a plurality of fuel injectors;

a pressurized fuel accumulating chamber having a fixed volume and connected to said fuel injectors to feed pressurized fuel in said pressurized fuel accumulating chamber into said fuel injectors;

a controllable fuel feed pump connected to said pressurized fuel accumulating chamber to feed pressurized fuel thereinto;

drive means for controlling the amount of pressurized fuel discharged from said fuel feed pump;

detecting means arranged in aid pressurized fuel accumulating chamber to produce an output signal representing the pressure of the pressurized fuel in said pressurized fuel accumulating chamber;

injection control means controlling an injection start timing and injection end timing of said fuel injectors in accordance with a change in a operating state of said engine; and pressure control means controlling said drive means in response to the output signal of said detecting means to equalize the pressure of the pressurized fuel in said pressurized fuel accumulating chamber to a predetermined pressure, said pressure control means comprising an engine speed sensor detecting the rotating speed of said engine, a load sensor detecting the load of said engine and a memory storing data which represents the relationship among an engine speed, an engine load and a desired pressure, said pressure control means controlling said drive means in response to output signals of said engine speed sensor and said load sensor to equalize the pressure of the pressurized fuel in said pressurized fuel accumulating chamber to said desired pressure on the basis of the data stored in said memory.

5. A fuel injection control device according to claim 4, wherein said pressurized fuel accumulating chamber is formed in an accumulating tube having a first end and a second end, and said detecting means is a pressure sensor arranged in said first end of said accumulating tube, said second end of said accumulating tube being connected to said fuel feed pump.

6. A fuel injection control device according to claim 1, wherein each of said fuel injectors comprises a fuel chamber connected to said pressurized fuel accumulating chamber and defined by said outer end of said control rod, and a needle pressure chamber formed around said pressure receiving face of said needle and connected to said fuel chamber, said nozzle bore being connected to said needle pressure chamber when said needle moves away from said nozzle bore.

7. A fuel injection control device according to claim 1, wherein said actuator comprises a casing surrounding said piezoelectric element and filled with fuel, and said piston comprises a fuel passage formed therein and connecting an interior of said casing to said control rod pressure chamber, and a check ball is arranged in said fuel passage and permitting the inflow of fuel into said control rod pressure chamber from the interior of said casing.

8. A fuel injection control device according to claim 1, wherein said actuator comprises a disc spring for urging said piston towards said piezoelectric element.

9. A fuel injection control device according to claim 2, wherein said drive means comprises a control lever movable in an axial direction of said stationary shaft and having a groove which is formed thereon and extended obliquely with respect to an axis of said stationary shaft, an arm formed on said stator and engaging with said groove, and a drive device actuating said control lever in a longitudinal direction thereof.

10. A fuel injection control device according to claim 9, wherein said drive device comprises a reduction gear apparatus and a stepper motor connected to said control lever via said reduction gear apparatus.

11. A fuel injection control device according to claim 3, wherein an amount of fuel of said main injection is obtained by subtracting the amount of fuel of said pilot injection from said total amount of fuel.

12. A fuel injection control device according to claim 3, wherein said injection control means comprises a temperature sensor detecting a temperature of the coolant of said engine, and said memory stores data representing the relationship between the temperature of the engine coolant and a temperature correction coefficient, the amount of fuel of said pilot injection being corrected by multiplying the amount of fuel of said pilot injection by said temperature correction coefficient.

13. A fuel injection control device according to claim 12, wherein said temperature correction coefficient is increased as the temperature of the engine coolant is reduced.

14. A fuel injection control device according to claim 3, wherein said injection control means comprises a temperature sensor detecting the temperature of the coolant of said engine, the injection start timing of said pilot injection being advanced as the temperature of the engine coolant is reduced.

15. A fuel injection control device according to claim 14, wherein said memory stores data representing the relationship between the temperature of said engine coolant and the injection start timing of said pilot injection.

16. A fuel injection control device according to claim 4, wherein said pressure control means comprises a temperature sensor detecting a temperature of the coolant of said engine, and said memory stores data representing the relationship among the engine speed, the engine load, and a basis pressure, said desired pressure being obtained by correcting said basis pressure by the temperature of the coolant.

17. A fuel injection control device according to claim 16, wherein said memory stores data representing a temperature correction coefficient which is increased as the temperature of the engine coolant is increased, said desired pressure being obtained by multiplying said basic pressure by said temperature correcting coefficient.

18. A fuel injection control device according to claim 4, wherein said pressure control means comprises a pressure sensor detecting pressure in an intake manifold of said engine, and said memory stores data representing the relationship among the engine speed, the engine load and a basic pressure, said desired pressure being obtained by correcting said basic pressure by the pressure in said intake manifold.

19. A fuel injection control device according to claim 18, wherein said memory stores data representing a pressure correction coefficient which is increased as the pressure in said intake manifold is increased, said desired pressure being obtained by multiplying said basic pressure by said pressure correction coefficient.

20. A fuel injection control device according to claim 18, wherein said intake manifold is provided with a turbocharger.

* * * * *